US010348983B2

(12) United States Patent
Ogasawara et al.

(10) Patent No.: US 10,348,983 B2
(45) Date of Patent: Jul. 9, 2019

(54) NON-TRANSITORY STORAGE MEDIUM ENCODED WITH COMPUTER READABLE IMAGE PROCESSING PROGRAM, INFORMATION PROCESSING SYSTEM, INFORMATION PROCESSING APPARATUS, AND IMAGE PROCESSING METHOD FOR DETERMINING A POSITION OF A SUBJECT IN AN OBTAINED INFRARED IMAGE

(71) Applicant: NINTENDO CO., LTD., Kyoto-shi, Kyoto (JP)

(72) Inventors: Yoshiyasu Ogasawara, Kyoto (JP); Shinichi Kinuwaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 353 days.

(21) Appl. No.: 14/799,709

(22) Filed: Jul. 15, 2015

(65) Prior Publication Data

US 2016/0063711 A1 Mar. 3, 2016

(30) Foreign Application Priority Data

Sep. 2, 2014 (JP) .................................. 2014-178055
Sep. 2, 2014 (JP) .................................. 2014-178056

(51) Int. Cl.
*H04N 5/33* (2006.01)
*G06T 7/73* (2017.01)
(Continued)

(52) U.S. Cl.
CPC .............. *H04N 5/332* (2013.01); *G06T 7/11* (2017.01); *G06T 7/136* (2017.01); *G06T 7/536* (2017.01);
(Continued)

(58) Field of Classification Search
CPC .............. G06F 3/017; G06K 9/00335; G06K 9/00362; G06K 9/00355;
(Continued)

(56) References Cited

U.S. PATENT DOCUMENTS 8,982,101 B2 * 3/2015 Leung .................. G06F 3/0425
345/175
9,330,307 B2 * 5/2016 Litvak ................ G06K 9/00382
(Continued)

FOREIGN PATENT DOCUMENTS

EP 2 487 647 A1 8/2012
JP 2001-28050 A 1/2001
(Continued)

OTHER PUBLICATIONS

Trujillo-Romero et al, 3D Data Sensing for Hand Pose Recognition, pp. 109-113, 2013.*

(Continued)

*Primary Examiner* — David E Harvey
(74) *Attorney, Agent, or Firm* — Nixon & Vanderhye P.C.

(57) ABSTRACT

A non-transitory storage medium encoded with a computer readable image processing program is provided. The image processing program causes a computer to perform functionality including obtaining an infrared image of a subject and determining a position of the subject included in the infrared image based on brightness and a size of a prescribed region of the subject within the infrared image.

21 Claims, 14 Drawing Sheets

(51) Int. Cl.
*G06T 7/536* (2017.01)
*G06T 7/571* (2017.01)
*G06T 7/11* (2017.01)
*G06T 7/90* (2017.01)
*G06T 7/136* (2017.01)

(52) U.S. Cl.
CPC ............... *G06T 7/571* (2017.01); *G06T 7/74* (2017.01); *G06T 7/90* (2017.01); *G06T 2207/10012* (2013.01); *G06T 2207/10024* (2013.01); *G06T 2207/10028* (2013.01); *G06T 2207/10048* (2013.01); *G06T 2207/10144* (2013.01); *G06T 2207/10152* (2013.01); *G06T 2207/20224* (2013.01); *G06T 2207/30196* (2013.01)

(58) Field of Classification Search
CPC ... G06T 2207/10028; G06T 7/60; G06T 7/50; G06T 2207/10048; G06T 7/74; G06T 7/536; G06T 7/571; G06T 7/11; G06T 7/90; G06T 7/136; H04N 5/332
See application file for complete search history.

(56) References Cited

U.S. PATENT DOCUMENTS

| | | | | |
|---|---|---|---|---|
| 9,721,383 | B1* | 8/2017 | Horowitz | G06T 17/20 |
| 9,842,249 | B2* | 12/2017 | Huang | G06K 9/00335 |
| 9,880,635 | B2* | 1/2018 | Kramer | G06F 3/017 |
| 2003/0137593 | A1* | 7/2003 | Watanabe | G06K 9/00651 348/274 |
| 2003/0156756 | A1* | 8/2003 | Gokturk | G06F 3/017 382/190 |
| 2004/0063481 | A1* | 4/2004 | Wang | A63F 13/02 463/8 |
| 2004/0130631 | A1* | 7/2004 | Suh | H04N 5/23293 348/222.1 |
| 2005/0025345 | A1* | 2/2005 | Ohta | B60H 1/0065 382/116 |
| 2005/0271279 | A1* | 12/2005 | Fujimura | G06K 9/00355 382/203 |
| 2006/0018513 | A1 | 1/2006 | Sogawa | |
| 2008/0205701 | A1* | 8/2008 | Shamaie | G06F 3/017 382/103 |
| 2010/0013615 | A1 | 1/2010 | Hebert et al. | |
| 2010/0067740 | A1* | 3/2010 | Hayasaka | G06K 9/00362 382/103 |
| 2010/0086217 | A1* | 4/2010 | Matsuhira | G06K 9/00221 382/199 |
| 2010/0159981 | A1* | 6/2010 | Chiang | G06F 3/017 455/556.1 |
| 2010/0269072 | A1* | 10/2010 | Sakata | G06F 1/1601 715/863 |
| 2011/0169866 | A1* | 7/2011 | Yoshikawa | A63F 13/428 345/660 |
| 2011/0316813 | A1* | 12/2011 | Gu | G06F 3/0428 345/175 |
| 2012/0139907 | A1* | 6/2012 | Lee | G06F 3/0304 345/419 |
| 2012/0194680 | A1* | 8/2012 | Ishii | G06K 9/00362 348/148 |
| 2013/0088422 | A1 | 4/2013 | Niikura et al. | |
| 2013/0241883 | A1* | 9/2013 | Leung | G06F 3/0425 345/175 |
| 2013/0243261 | A1 | 9/2013 | Matsuda et al. | |
| 2013/0342443 | A1* | 12/2013 | Huang | G06F 3/017 345/156 |
| 2014/0023230 | A1* | 1/2014 | Huang | G06K 9/00335 382/103 |
| 2014/0071268 | A1 | 3/2014 | Lord et al. | |
| 2014/0155158 | A1* | 6/2014 | Adachi | A63F 13/00 463/31 |
| 2014/0181710 | A1* | 6/2014 | Baalu | G06F 3/0484 715/765 |
| 2014/0192206 | A1* | 7/2014 | Holz | H04N 5/23241 348/169 |
| 2014/0201690 | A1* | 7/2014 | Holz | G06F 3/017 715/863 |
| 2014/0306875 | A1* | 10/2014 | He | G06F 3/017 345/156 |
| 2015/0103004 | A1* | 4/2015 | Cohen | G06F 3/0483 345/158 |
| 2015/0104075 | A1* | 4/2015 | MacDougall | G06K 9/00355 382/106 |
| 2015/0131852 | A1* | 5/2015 | Sweetser | G01B 11/14 382/103 |
| 2015/0185851 | A1* | 7/2015 | Kauffmann | G06F 3/017 345/156 |
| 2015/0241981 | A1* | 8/2015 | Kim | G06F 3/017 345/156 |
| 2015/0279019 | A1* | 10/2015 | Hsin | G06F 3/017 348/77 |

FOREIGN PATENT DOCUMENTS

| | | | |
|---|---|---|---|
| JP | 2005-037758 A | * | 2/2005 |
| JP | 2005-350010 | | 12/2005 |
| JP | 2007-89094 A | | 4/2007 |
| JP | 2008-65463 A | | 3/2008 |
| JP | 2008-123113 A | | 5/2008 |
| JP | 2009-10669 A | | 1/2009 |
| JP | 2009-119579 A | | 6/2009 |
| JP | 2009-232351 A | | 10/2009 |
| JP | 2010-22700 A | | 2/2010 |
| JP | 2010-35237 A | | 2/2010 |
| JP | 2011-198270 A | | 10/2011 |
| JP | 2013-080413 | | 5/2013 |
| JP | 2014-56295 A | | 3/2014 |
| JP | 2014-85920 A | | 5/2014 |
| KR | 2011-0026566 | | 3/2011 |
| WO | WO 2008/056261 A2 | * | 5/2008 |
| WO | 2012/029382 A1 | | 3/2012 |

OTHER PUBLICATIONS

Extended Search Report dated Apr. 20, 2016 issued in corresponding European Application No. 15176430.5 (9 pgs.).

* cited by examiner 30  32

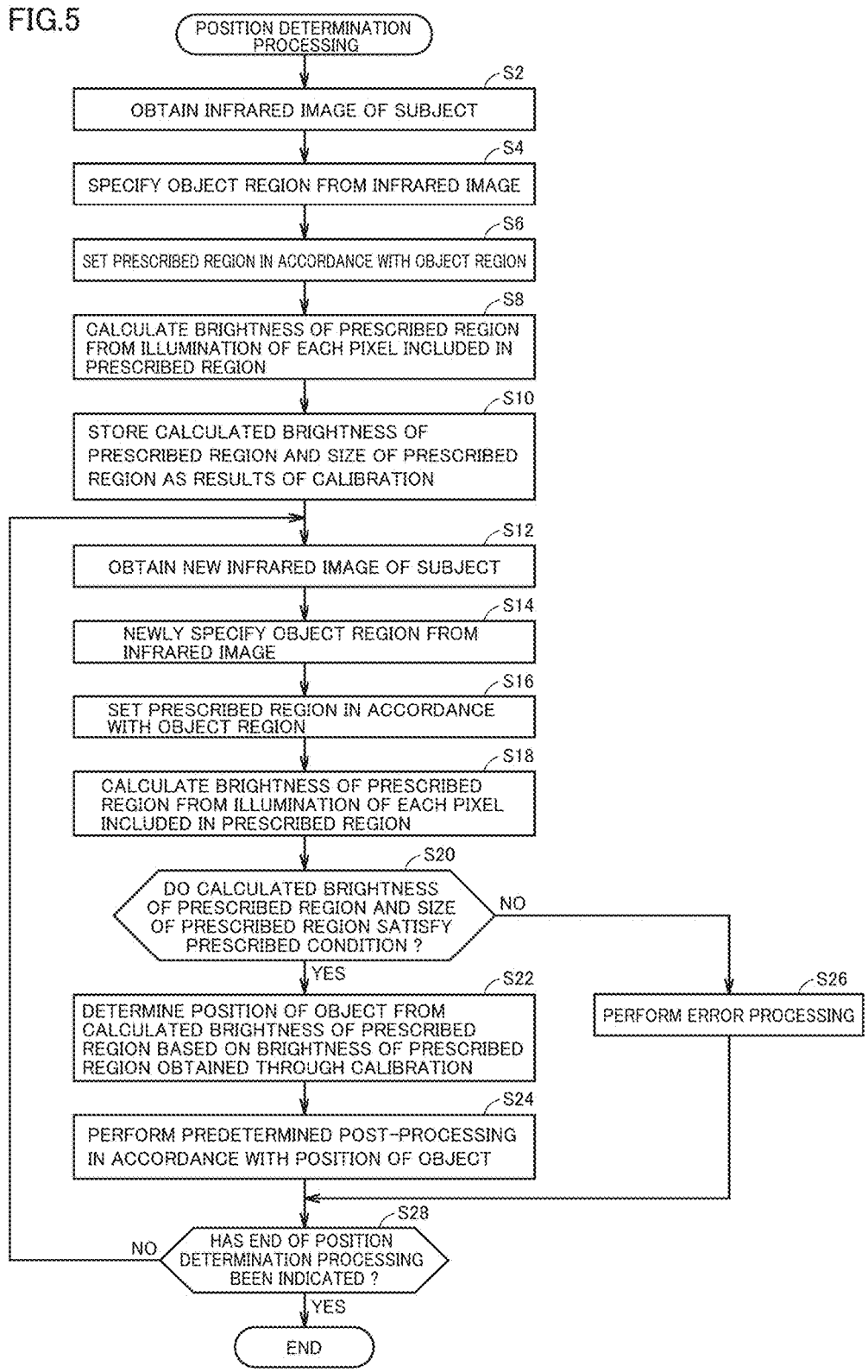

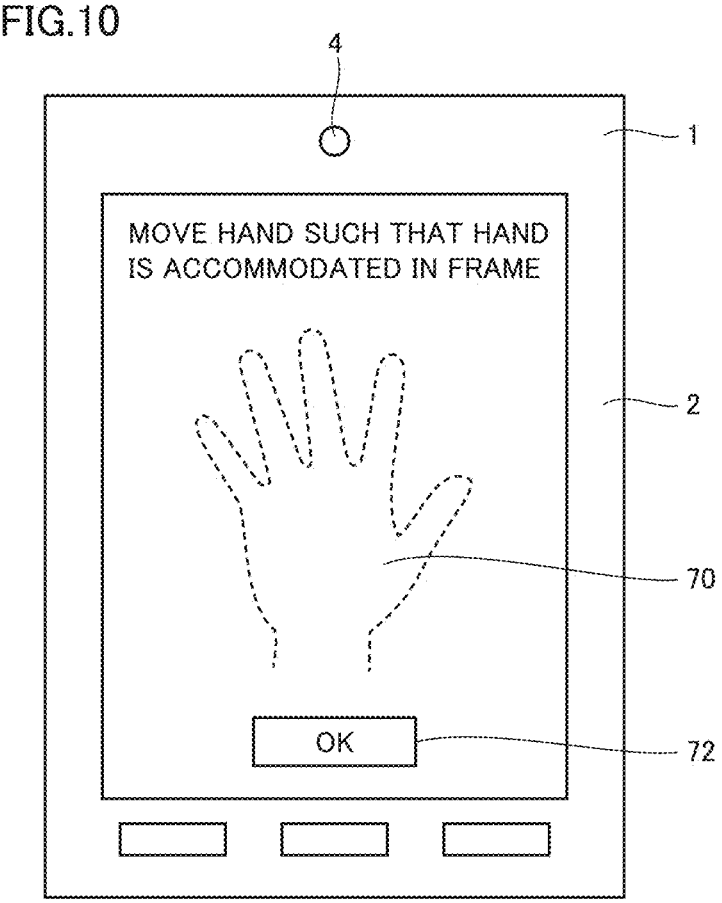

RGB domain

YUV domain

NON-TRANSITORY STORAGE MEDIUM ENCODED WITH COMPUTER READABLE IMAGE PROCESSING PROGRAM, INFORMATION PROCESSING SYSTEM, INFORMATION PROCESSING APPARATUS, AND IMAGE PROCESSING METHOD FOR DETERMINING A POSITION OF A SUBJECT IN AN OBTAINED INFRARED IMAGE

This nonprovisional application is based on Japanese Patent Applications Nos. 2014-178055 and 2014-178056 filed with the Japan Patent Office on Sep. 2, 2014, the entire contents of each of which are hereby incorporated by reference.

FIELD

An embodiment relates to a non-transitory storage medium encoded with a computer readable image processing program capable of processing an infrared image, an information processing system, an information processing apparatus, and an image processing method.

BACKGROUND AND SUMMARY

A stereo vehicle exterior monitoring apparatus monitoring surroundings of a vehicle using stereo cameras constituted of a pair of infrared cameras has been known.

The apparatus calculates distance data with the use of the stereo infrared cameras and monitors a target based on the calculated distance data. According to this conventional technique, stereo (that is, a plurality of) infrared cameras are required and there is a room for improvement in cost for mounting.

The object above can be achieved, for example, as follows.

An exemplary embodiment provides a non-transitory storage medium encoded with a computer readable image processing program executed by a computer. The image processing program causes the computer to perform functionality including obtaining an infrared image of a subject and determining a position of the subject included in the infrared image based on brightness and a size of a prescribed region of the subject within the infrared image.

In the exemplary embodiment, the step of determining the position may determine a relative position of the subject with a reference position.

In the exemplary embodiment, the step of determining the position may include determining the reference position based on an infrared image corresponding to the subject positioned in a reference state.

In the exemplary embodiment, the step of determining the position may include determining a position of the subject based on the brightness of the prescribed region at the time when the size of the prescribed region satisfies a prescribed condition.

In the exemplary embodiment, the step of determining the position may include determining a depth position of the subject in a direction of image pick-up by an image pick-up portion which obtains the infrared image, based on the brightness and the size of the prescribed region.

In the exemplary embodiment, the step of determining the position may include determining the depth position and determining a position on a surface orthogonal to the direction of the subject based on a position of the prescribed region within the infrared image.

In the exemplary embodiment, the step of determining the position may include specifying a region of the subject from the infrared image and specifying the prescribed region in accordance with the specified region.

In the exemplary embodiment, the step of specifying the region may include specifying the prescribed region of the subject based on at least a part of a shape which the subject intrinsically has.

In the exemplary embodiment, the step of determining the position may include determining a position of the subject when the brightness of the prescribed region and the size of the prescribed region satisfy prescribed relation.

In the exemplary embodiment, the step of determining the position may include determining the position of the subject when change over time in brightness of the prescribed region and change over time in size of the prescribed region maintain the prescribed relation.

In the exemplary embodiment, the step of determining the position may include determining the position of the subject when magnitude of change over time in brightness of the prescribed region and magnitude of change over time in size of the prescribed region maintain the prescribed relation.

In the exemplary embodiment, the step of determining the position may include outputting change over time in position of the subject.

In the exemplary embodiment, the step of obtaining the image may include obtaining an infrared image which is picked up during emission of infrared rays to the subject.

An exemplary embodiment provides an information processing system. The information processing system includes an image pick-up portion which picks up an image of infrared light from a subject and a processing portion which determines a position of the subject included in the infrared image based on brightness and a size of a prescribed region of the subject within the infrared image obtained as a result of image pick-up by the image pick-up portion.

An exemplary embodiment provides an information processing apparatus. The information processing apparatus includes an image obtaining module that obtains an infrared image of a subject and a position determination module that determines a position of the subject included in the infrared image based on brightness and a size of a prescribed region of the subject within the infrared image.

An exemplary embodiment provides an information processing method. The image processing method includes obtaining an infrared image of a subject and determining a position of the subject included in the infrared image based on brightness and a size of a prescribed region of the subject within the infrared image.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 shows an exemplary illustrative non-limiting flowchart illustrating a processing procedure in the position determination processing provided by the image processing program in the present embodiment.

FIG. 10 shows an exemplary illustrative non-limiting drawing illustrating one example of a user interface for calibration provided by the information processing apparatus in the present embodiment.

DETAILED DESCRIPTION OF NON-LIMITING EXAMPLE EMBODIMENTS

Figure 1:
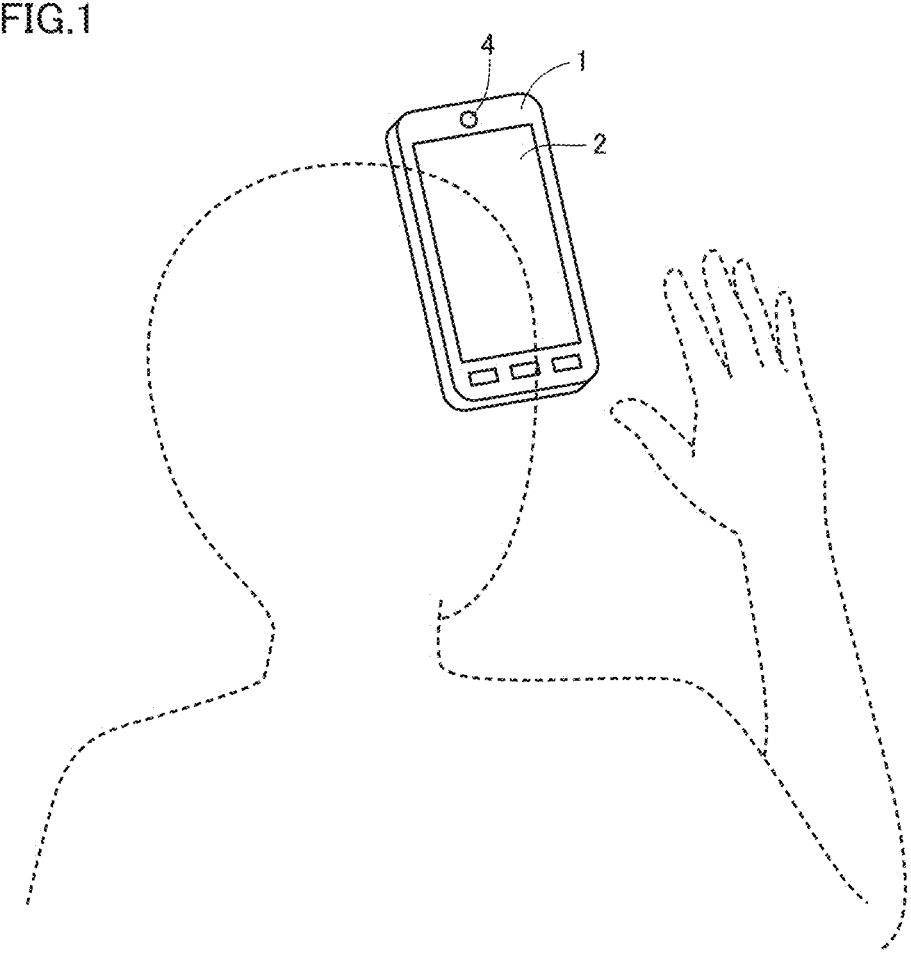
FIG. 1 shows an exemplary illustrative non-limiting drawing illustrating an application example of an image processing program in the present embodiment.

The present embodiment will be described in detail with reference to the drawings. The same or corresponding elements in the drawings have the same reference characters allotted and description thereof will not be repeated.

<A. Application Example>

An application example of an image processing program in the present embodiment will initially be described. Referring to FIG. 1, the image processing program in the present embodiment is executed in an information processing apparatus 1 and a position of a subject is determined by performing processing as will be described later on an image obtained as a result of image pick-up of the subject. In the present embodiment, an infrared image (which may hereinafter be denoted as an "infrared (IR) image") mainly including information of infrared rays from a subject is obtained, and processing is performed on that infrared image. The infrared image herein includes at least any information of infrared rays resulting from reflection by a subject and infrared rays generated by a subject itself. Furthermore, the infrared image should only mainly include infrared information, and an image including visible ray information together with infrared information is not excluded.

In one of application examples, as shown in FIG. 1, an image of a part of a body (for example, a hand or a finger) of a user as a subject is picked up and a position of the part of the body of the user is determined every prescribed cycle or for each event. The determined position may be a relative position of a subject with a reference position or an absolute position from information processing apparatus 1 (strictly, an image pick-up portion 4).

A typical example of information processing apparatus 1 includes not only a portable information processing apparatus (FIG. 1 showing an example of a smartphone) but also a stationary information processing apparatus (for example, a personal computer or a television set) and a camera. Information processing apparatus 1 includes image pick-up portion 4 picking up an image of infrared light from a subject. Image pick-up portion 4 may be able to obtain a non-infrared image in addition to an infrared image. A processing portion performing various types of processing as will be described later and image pick-up portion 4 can also be implemented as independent housings and they can be mounted as an information processing system as being combined with each other.

A non-infrared image means an image mainly including information of light different in wavelength from infrared rays from a subject and typically includes a visible light image mainly including information of visible rays from a subject. The visible light image may be output as an RGB image, a gray-scale image, or a binarized (monochrome) image. An ultraviolet image mainly including information of ultraviolet rays from a subject may be employed as the non-infrared image.

Information processing apparatus 1 shown in FIG. 1 incorporates a display 2 which displays information on a determined position of a subject and a state of execution of an application with the use of the determined position. The determined position may be input as information representing a gesture of a user or may be used for game processing with the determined position being used as it is as an input value.

<B. Configuration Example>

Figure 2:
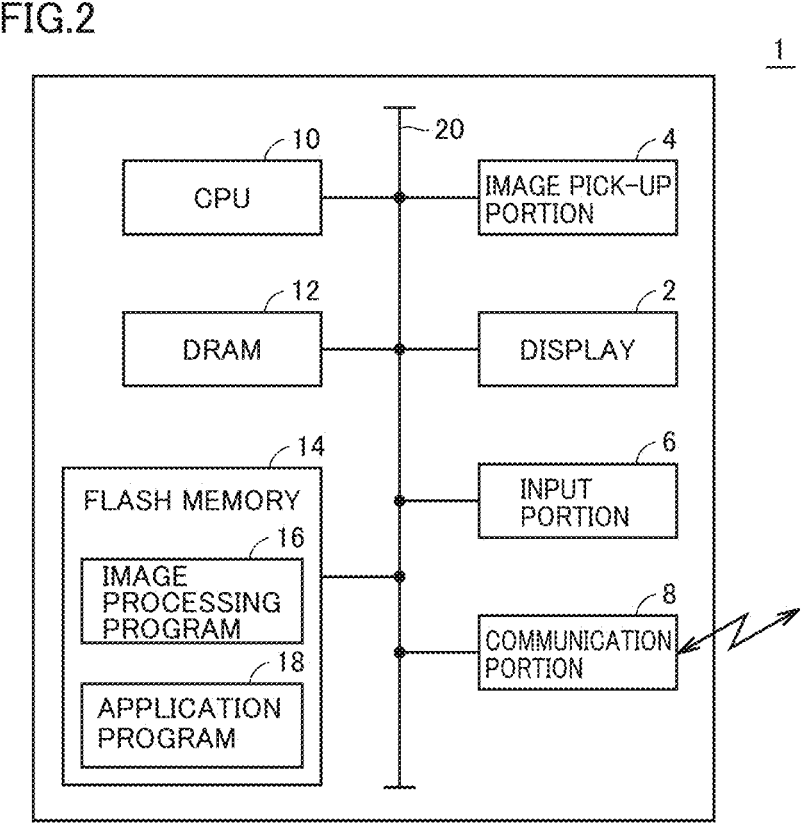
FIG. 2 shows an exemplary illustrative non-limiting drawing illustrating a configuration example of an information processing apparatus in the present embodiment.

A configuration example of information processing apparatus 1 will now be described. Referring to FIG. 2, information processing apparatus 1 includes, as typical components, display 2, image pick-up portion 4, an input portion 6, a communication portion 8, a central processing unit (CPU) 10, a dynamic random access memory (DRAM) 12, and a flash memory 14.

Image pick-up portion 4 receives light from a subject and outputs an image showing the subject. In the present embodiment, image pick-up portion 4 outputs an infrared image of a subject. The infrared image mainly includes information of infrared rays from a subject. In addition, image pick-up portion 4 may output a non-infrared image mainly including information of light different in wavelength from infrared rays from a subject. Namely, image pick-up portion 4 picking up an image of infrared light from the subject and light different in wavelength from infrared rays from the subject may be adopted.

Display 2 is a device notifying a user of various types of information and implemented by a liquid crystal display (LCD) or an organic electroluminescence (EL) display.

Input portion 6 is a device accepting an instruction or an operation from a user, and it may be mounted as various buttons or switches provided in a housing of information processing apparatus 1 or may be mounted as a touch panel arranged integrally with display 2.

Communication portion 8 is a device mediating communication with another apparatus and mounted with the use of a mobile communication component such as long term evolution (LTE) or third generation (3G) or a near field communication component such as wireless LAN complying with IEEE 802.11n specifications, Bluetooth®, or infrared data association (IRDA).

CPU 10 represents one example of processors executing various programs and implements a main portion of the processing portion. DRAM 12 functions as a working memory temporarily holding data necessary for CPU 10 to execute various programs. Flash memory 14 is a storage device holding various types of data in a non-volatile manner, and typically stores an image processing program 16 and various application programs 18. These programs are read and developed on DRAM 12 and then executed by CPU 10.

Hardware and software implementing information processing apparatus 1 are not limited to those shown in FIG. 2. For example, an external server device may have functions of information processing apparatus 1 in the entirety or in part. Namely, instead of a single information processing apparatus 1, an information processing system constituted of a terminal and one or more servers may be employed. In this case, each means in the information processing system is implemented by processing by a processor of the terminal, processing by a processor of the external server device, or cooperative processing by the processor of the terminal and the processor of the external server device. Allocation of processing can be designed as appropriate based on the common general technical knowledge of a person skilled in the art.

Image processing program 16 executed in information processing apparatus 1 is not limited to that provided by a storage medium but may be provided by downloading through a network such as the Internet.

<C. Overview Of Position Determination Processing>

Overview of position determination processing performed by the image processing program in the present embodiment will now be described. The position determination processing in the present embodiment determines a position of a (portion of interest of a) subject based on information of an image showing the subject included in an obtained infrared image. A portion of a subject (i.e. a real substance) of which position is to be determined is hereinafter referred as an "object" and a region corresponding to the "object" within the infrared image is referred to as an "object region".

Brightness (illumination) and a size of an object region within the infrared image obtained as a result of image pick-up of an object by image pick-up portion 4 have correlation with factors as below. More specifically, brightness of the object region is in proportion to factors below:

Brightness (illumination/intensity) of infrared rays emitted to a subject;
A time period of exposure in the image pick-up portion;
A surface reflectance of an object; and
$1/(\text{distance from image pick-up portion } \mathbf{4} \text{ to the object})^2$.

A size of an object region is in inverse proportion to a distance from image pick-up portion 4 to the object.

The position determination processing in the present embodiment determines, with the use of such physical relationship, a position of an object (a subject) included in an infrared image based on brightness and a size of a prescribed region of the subject within the infrared image. The prescribed region corresponds to a region including at least a part of a region expressing the object (that is, the object region), and can be specified based on at least a part of a shape which the subject (object) intrinsically has.

In the present embodiment, by using the infrared image mainly including information of infrared rays from the subject, a position can be determined with accuracy higher than in a case of use of a visible light image mainly including information of visible rays from the subject.

Figure 3:
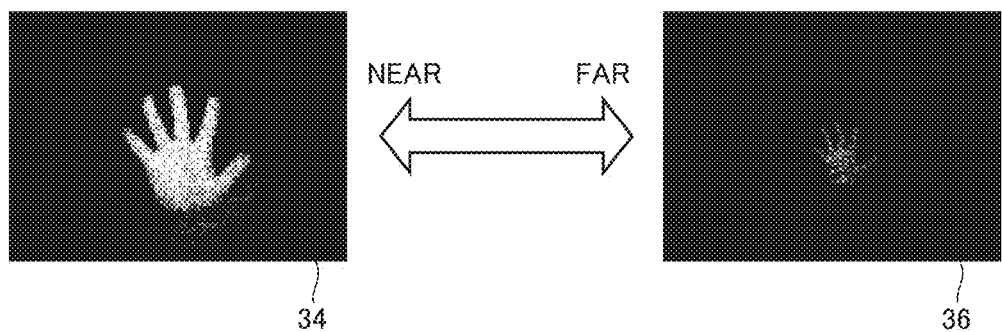
FIGS. 3 and 4 each show an exemplary illustrative non-limiting drawing illustrating overview of position determination processing performed by the image processing program in the present embodiment.
Figure 4:
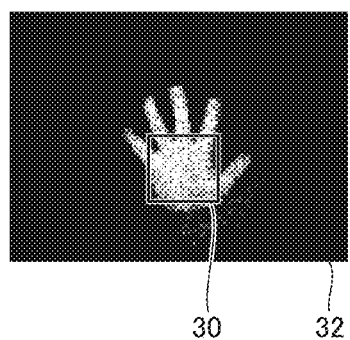

Overview of the position determination processing performed by the image processing program in the present embodiment will be described with reference to FIGS. 3 and 4. FIGS. 3 and 4 each show an example of an infrared image obtained at the time when a user's hand is defined as an object by way of example. As shown in FIG. 3, when a distance from image pick-up portion 4 to the object is relatively short, an object region within the infrared image is relatively bright (illumination is high) and an area thereof is relatively large (wide). In contrast, when a distance from image pick-up portion 4 to the object is relatively large, the object region within the infrared image is relatively dark (illumination is low) and an area thereof is relatively small (narrow).

Whether the object has moved closer or away is determined based on brightness (illumination/intensity) and a size of the object region which appears in such an infrared image, with a reference position. A method of calculating a distance between image pick-up portion 4 and an object (a relative distance) with a position of the object (subject) positioned in a reference state (the reference position) being defined as the reference will be described hereinafter as a typical example.

FIG. 4 is a diagram showing one example of an infrared image picked up at the time when an object is in the reference state. Referring to FIG. 4, a user places his/her hand at a position where the user would use the hand in a normal action and an infrared image is obtained in response to some trigger. This trigger may directly be input by the user, or a trigger may be such that infrared images are repeatedly obtained and subjected to some kind of image processing and a result thereof satisfies a predetermined condition.

When the infrared image in the reference state is obtained, an object region (in the example in FIG. 4, a contour of a hand) is specified from the infrared image. A prescribed region 30 is set in accordance with the specified object region. A representative value (an initial value) for illumination at the reference position is determined based on illumination of each pixel included in prescribed region 30. An average value of illumination of all pixels included in prescribed region 30 can be calculated as the representative value (initial value). In calculation of the representative value, an abnormal value of illumination included in prescribed region 30 may be excluded.

A procedure for obtaining a reference position and initial information relating thereto (for example, a representative value), which includes the processing as shown in FIG. 4, will hereinafter also be referred to as "calibration".

For example, a distance from image pick-up portion 4 to an object in prescribed region 30 within an infrared image 32 shown in FIG. 4 is set as "1". Here, it is assumed that a calculated average value of brightness is "100" and a size of prescribed region 30 is "100×100" pixels.

An infrared image 34 (near) shown in FIG. 3 is an infrared image obtained at the time when a hand is placed at a position at a distance "0.7" time as large as a distance from image pick-up portion 4 to the object at the time of image pick-up of infrared image 32 (FIG. 4), and here, a size of prescribed region 30 was calculated as "160×160" pixels and an average value of brightness was calculated as "204".

An infrared image 36 (far) shown in FIG. 3 is an infrared image obtained at the time when a hand is placed at a position at a distance "2.0" times as large as a distance from image pick-up portion 4 to the object at the time of image pick-up of infrared image 32 (FIG. 4), and here, a size of prescribed region 30 was calculated as "60×60" pixels and an average value of brightness was calculated as "25".

A processing procedure in the position determination processing provided by the image processing program in the present embodiment will be described with reference to FIG. 5. Each step shown in FIG. 5 is implemented typically as CPU 10 executes image processing program 16 (FIG. 2).

Initially, calibration shown in steps S2 to S10 is carried out. Specifically, CPU 10 obtains an infrared image of a subject (step S2). Here, it is assumed that an object (a subject) of which position is to be determined is in the reference state. The infrared image is obtained as CPU 10 provides a command to image pick-up portion (FIG. 2).

In succession, CPU 10 specifies an object region (a region of the subject) from the infrared image (step S4) and sets a prescribed region in accordance with the specified object region (step S6). CPU 10 calculates a representative value for illumination based on illumination of each pixel included in the specified prescribed region (step S8). This representative value for illumination is stored as an initial value for illumination at the reference position. Then, CPU 10 has the calculated representative value for illumination (brightness of the prescribed region) and the size of the prescribed region stored as results of calibration (step S10).

In calibration, brightness and a size of a prescribed region corresponding to a position of the object (subject) in the reference state (reference position) are determined, and a relative position of the object is successively determined with the position in this reference state being defined as the reference. Namely, in accordance with a procedure as below, CPU 10 determines a position of the subject included in the infrared image based on brightness and a size of the prescribed region within the infrared image.

Specifically, CPU 10 obtains a new infrared image (step S12). Then, CPU 10 newly specifies an object region (a region of the subject) from the infrared image (step S14) and sets a prescribed region in accordance with the specified object region (step S16). In succession, CPU 10 calculates a representative value for illumination of the prescribed region (brightness of the prescribed region) based on illumination of each pixel included in the prescribed region specified in step S16 (step S18) and determines whether or not calculated brightness and the size of the prescribed region satisfy a prescribed condition (step S20).

When brightness and the size of the prescribed region satisfy the prescribed condition (YES in step S20), CPU 10 determines a position of the object from calculated brightness of the prescribed region based on brightness of the prescribed region obtained in calibration (step S22). In succession, CPU 10 performs predetermined post-processing in accordance with the determined position of the object (step S24). Namely, a position determination function of information processing apparatus 1 determines a position of an object (subject) when brightness of a prescribed region and a size of the prescribed region satisfy prescribed relation.

When brightness and the size of the prescribed region do not satisfy the prescribed condition (NO in step S20), CPU 10 performs error processing (step S26).

CPU 10 determines whether or not end of the position determination processing has been indicated (step S28). When end of the position determination processing has not been indicated (NO in step S28), processing in step S12 or later is repeated. In contrast, when end of the position determination processing has been indicated (YES in step S28), the position determination processing ends.

<D. Processing And Mechanism For Obtaining Infrared Image>

Processing for obtaining an infrared image and a mechanism used therefor will now be described.

(d1: Image Pick-up Element)

Figure 6A:
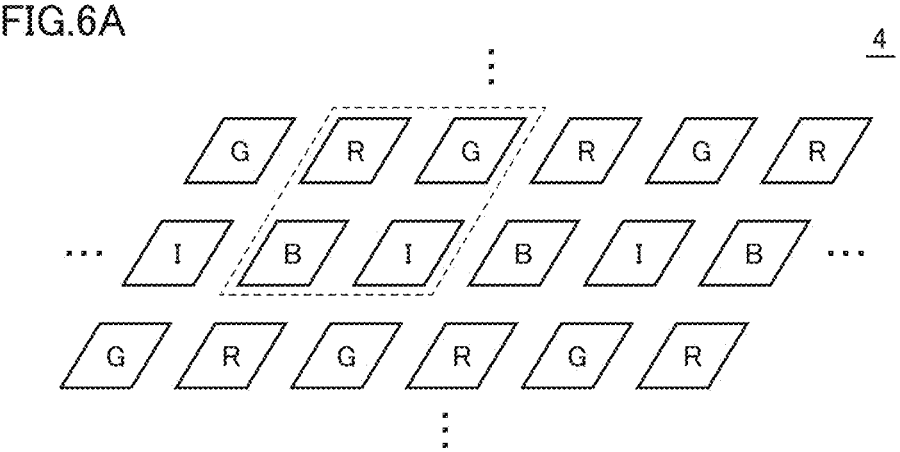
FIGS. 6A and 6B show exemplary illustrative non-limiting drawings illustrating some configuration examples of an image pick-up portion of an information processing apparatus in the present embodiment.

Some configuration examples of image pick-up portion 4 of information processing apparatus 1 in the present embodiment will be described with reference to FIGS. 6A and 6B. FIG. 6A shows a configuration example including image pick-up elements in Bayer arrangement including an IR filter and FIG. 6B is a diagram showing a configuration example in which image pick-up elements generating an infrared image (IR image) and a non-infrared image (RGB image) respectively are individually provided.

The image pick-up elements shown in FIG. 6A are image pick-up elements in which one G filter of four color filters (R+G×2+B) has been replaced with an IR filter in general image pick-up elements in Bayer arrangement. The IR filter has characteristics to allow passage of infrared rays and infrared rays from a subject are incident on a detection element associated with the IR filter, which detects illumination thereof. Detection elements associated with R, G, and B filters, respectively, detect illumination of visible rays from the subject. An IR image is generated based on information from the detection element associated with the IR filter and an RGB image is generated based on information from the detection elements associated with the R, G, and B filters, respectively.

Namely, in the configuration example shown in FIG. 6A, information processing apparatus 1 obtains an infrared image and a non-infrared image from the image pick-up elements in Bayer arrangement including the IR filter.

Figure 6B:
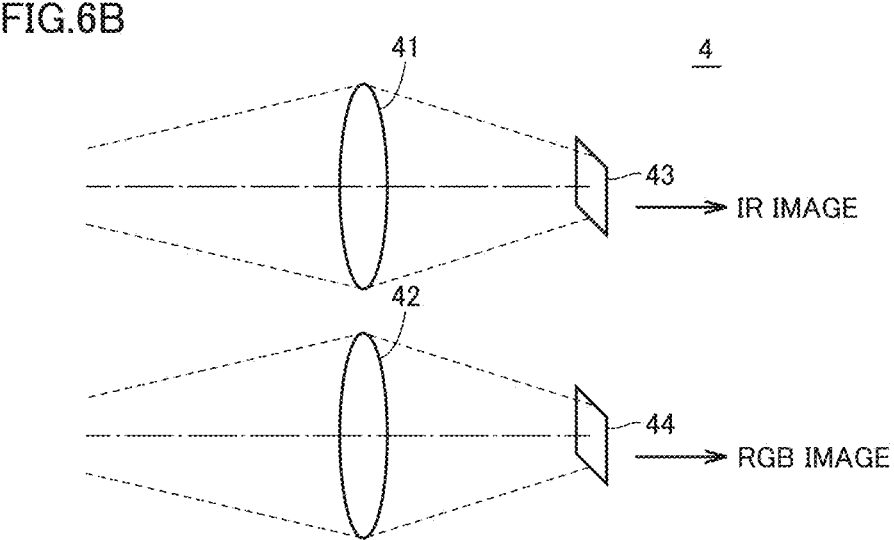

On the other hand, in the configuration example shown in FIG. 6B, a dual-eye optical system is employed. Namely, light reflected from the subject is guided to image pick-up elements 43 and 44 through lenses 41 and 42, respectively. A not-shown IR filter is associated with image pick-up element 43 and a not-shown color (RGB) filter is associated with image pick-up element 44. Thus, image pick-up element 43 generates an infrared image (IR image) and image pick-up element 44 generates a non-infrared image (RGB image).

A configuration in which an independent image pick-up element is arranged for each of R, G, and B may be adopted as another configuration example. In this case, four image pick-up elements in total of R, G, B, and IR are arranged. A plurality of image pick-up elements may be arranged with a lens being common thereto.

By adopting any configuration described above, an infrared image and a non-infrared image (typically, an RGB image) can simultaneously be obtained from the same subject.

(d2: Infrared Ray Projection Function)

An infrared ray projection function will now be described. An infrared image is mainly generated from information of infrared rays from a subject, however, an amount of infrared rays incident on the subject is not sufficient in many cases in a general environment of use. Therefore, an infrared ray projection function is preferably incorporated as a function of image pick-up portion 4. Namely, as a function of information processing apparatus 1 to obtain an image, an infrared image which is picked up during emission of infrared rays to a subject is preferably obtained.

Figure 7:
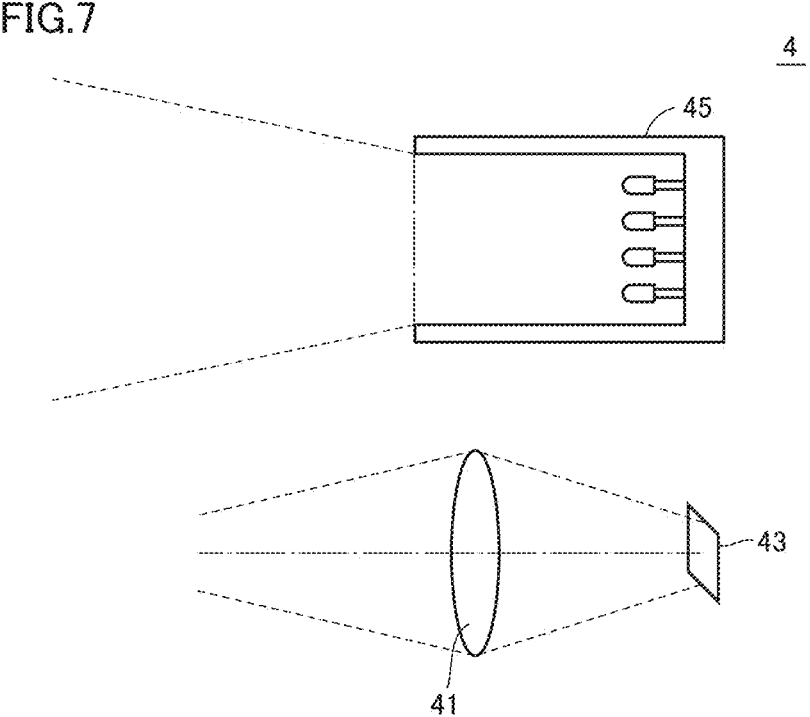
FIG. 7 shows an exemplary illustrative non-limiting drawing illustrating a configuration example of the image pick-up portion incorporating an infrared ray projection function of the information processing apparatus in the present embodiment.

A configuration example of image pick-up portion 4 incorporating an infrared ray projection function of information processing apparatus 1 in the present embodiment will be described with reference to FIG. 7. In addition to lens 41 guiding light from the subject to image pick-up element 43, an emission portion 45 emitting infrared rays to the subject is provided. Emission portion 45 has a portion generating infrared rays, such as an infrared LED or an infrared lamp, and emits generated infrared rays to the subject. The timing of exposure by image pick-up element 43 and the timing of light emission by emission portion 45 are in synchronization with each other.

Since an image pick-up condition can be stabilized by incorporating such a ray projection function, accuracy in determination of a position of an object can be enhanced.

A function similar to common strobe light in addition to infrared rays may be added to emission portion 45. Namely, emission portion 45 may be configured to simultaneously emit infrared rays and visible rays to the subject.

(d3: Control Dependent on Distance from Image Pick-up Portion to Object)

Figure 8:
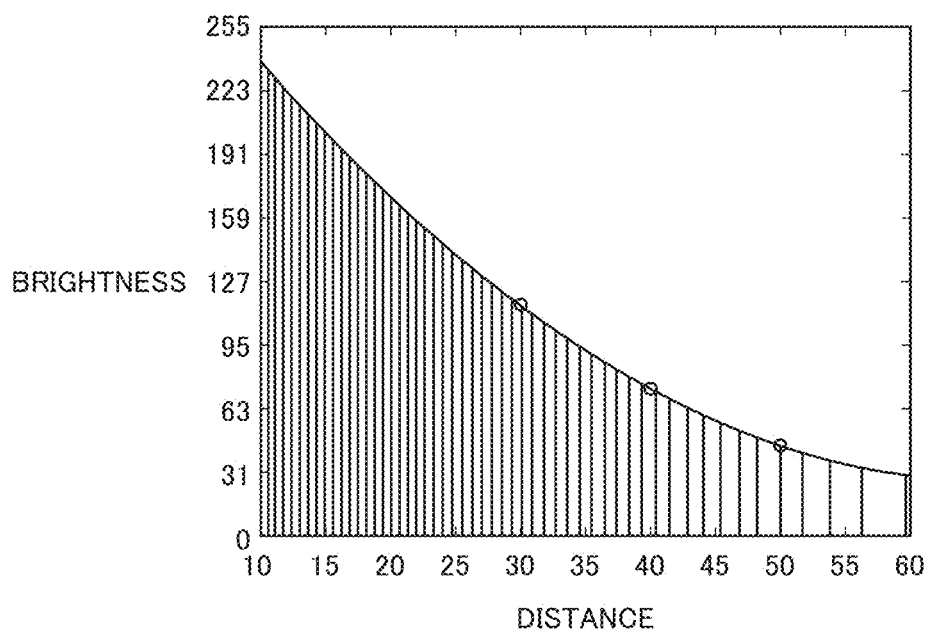
FIG. 8 shows an exemplary illustrative non-limiting drawing illustrating relation between a distance from the image pick-up portion to an object and brightness of infrared rays detected by the image pick-up portion when an image pick-up condition is constant.

FIG. 8 shows relation between a distance from image pick-up portion 4 to an object and brightness of infrared rays detected by image pick-up portion 4 when an image pick-up condition is constant. A distance and brightness are expressed in an arbitrary unit. As described above, since brightness of an object region within an infrared image is in inverse proportion to a square of (a distance from image pick-up portion 4 to the object), brightness of infrared rays detected by image pick-up portion 4 gradually decreases as the object is away from image pick-up portion 4 as shown in FIG. 8. Change in distance corresponding to change per unit of detected brightness is greater as the distance is greater, which means that sensitivity in calculation of a distance (that is, resolution) lowers as the object is away from image pick-up portion 4. In a characteristic example shown in FIG. 8, resolution is approximately 0.5 when a distance is less than 20, and resolution is approximately 1 when a distance is from 20 to 40. When a distance is 40 or more, however, resolution of only approximately 2.5 is obtained.

Since a range of brightness of infrared rays detectable by image pick-up portion 4 is restricted to a finite gray-scale value (typically, from 0 to 255 levels of gray), a time period of exposure by image pick-up portion 4 (a shutter speed) as well as brightness of infrared rays emitted from emission portion 45 and/or a time period of emission are preferably varied depending on a distance from image pick-up portion 4 to the object. For example, a known autoexposure (AE) function can be used.

More specifically, the function of information processing apparatus 1 (CPU 10) to obtain an image provides a control command to emission portion 45 so as to emit more intense infrared rays as a distance to the subject is longer. Namely, when a distance from image pick-up portion 4 to the object is relatively long, brightness of infrared rays incident on image pick-up portion 4 is relatively low and hence more intense infrared rays are emitted.

In addition, the function of information processing apparatus 1 (CPU 10) to obtain an image provides a control command such that a time period of exposure by the image pick-up portion for obtaining an infrared image is longer as a distance to the subject is longer. Namely, when a distance from image pick-up portion 4 to the object is relatively long, brightness of infrared rays incident on image pick-up portion 4 is relatively low and hence a time period of exposure by image pick-up portion 4 is controlled such that infrared rays are incident for a longer period of time.

A distance from image pick-up portion 4 to an object can be determined with the use of a result of determination of a distance of an object in the past. Typically, a distance determined in an immediately preceding operation cycle may be used to determine an image pick-up condition (a time period of emission of infrared rays/emission intensity and a time period of exposure).

(d4: Method of Exposure by Image Pick-up Portion)

Any of a rolling shutter technique and a global shutter technique may be employed as a method of exposure by image pick-up portion 4. The rolling shutter technique is suitable for a portable information processing apparatus, because it adopts progressive scanning and power consumption is relatively low. On the other hand, according to the global shutter technique, since a time period of exposure is relatively short, image pick-up of a vigorously moving subject can more appropriately be achieved.

<E. Details Of Position Determination Processing>

(e1: Specifying Object Region (Region of Subject) (Steps S4 and S14))

A method of specifying an object region can include, for example, a method of extracting a geometry from a feature point (for example, an edge point at which illumination significantly varies) in distribution of illumination within an infrared image, a method of extracting a region or a geometry based on other feature values included in an infrared image, and a method of extraction based on at least a part of a shape which a subject (object) intrinsically has.

In the examples shown in FIGS. 3 and 4 described above, a hand (palm) is defined as the object. Therefore, an object region can be specified by searching for a specific shape of the hand (for example, portions showing five fingers). Namely, a contour (or a geometry) of the hand can be specified based on a feature value within an infrared image.

(e2: Setting of Prescribed Region in Accordance with Object Region (Steps S6 and S16))

A prescribed region is set in accordance with an object region corresponding to the specified hand. The prescribed region is not limited to a rectangular shape, and a geometry indicating a feature value (an object region) may be employed as it is. When a shape of the object has already been known, a shape similar to that already-known shape may be employed. Alternatively, a prescribed region may be set so as to include a region outside the object region.

In the examples shown in FIGS. 3 and 4, a region corresponding to the palm of a user is preferably set as prescribed region 30. Namely, fingers of the hand of the user are preferably excluded from prescribed region 30. Since fingers of the hand are relatively great in motion over time and calculated illumination is unstable, they are preferably excluded. Brightness of infrared rays reflected from the subject is dependent on a reflectance at the surface of the subject. Movement of fingers of the hand which leads to relatively significant change in reflectance is also a cause of unsuitableness of the fingers for use in position determination. Therefore, in order to enhance accuracy in position determination, such a vigorously moving portion is preferably excluded.

(e3: Robustness of Brightness of Prescribed Region and Size of Prescribed Region (Step S20))

In the position determination processing in the present embodiment, basically, a position of an object is determined based on a representative value calculated from illumination of a pixel included in a prescribed region. Here, there is also a case that a substance other than the object of interest has been photographed in an infrared image, and there is also a possibility that a position is erroneously determined due to a partial image caused by such a substance. Therefore, such erroneous position determination is avoided by using conditions as below. All or some of the conditions below may be employed.

(1) Brightness of the Prescribed Region and a Size of the Prescribed Region Satisfying Prescribed Relation One condition is such that whether or not brightness of the prescribed region and a size of the prescribed region satisfy prescribed relation is determined, and when the prescribed relation is satisfied, a position of a subject may be determined based on brightness of the prescribed region.

As described above, brightness of an object region is in inverse proportion to a square of a distance from image pick-up portion 4 to an object, and a size of the object region is in inverse proportion to the distance from image pick-up portion 4 to the object. Therefore, essentially, brightness of the prescribed region and the size of the prescribed region set in accordance with the object region maintain prescribed relation.

Figure 9A:
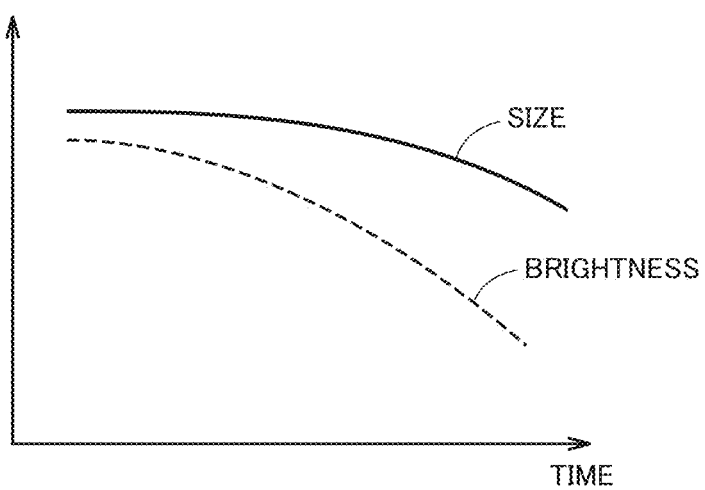
FIGS. 9A and 9B each show an exemplary illustrative non-limiting drawing illustrating relation between brightness of a prescribed region and a size of the prescribed region.
Figure 9B:
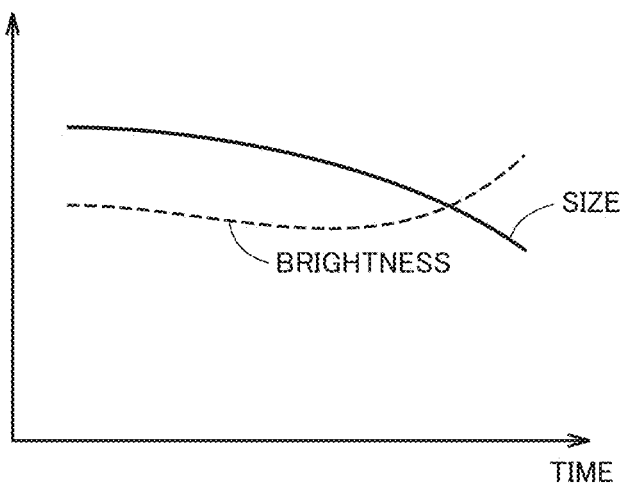

FIGS. 9A and 9B show relation between brightness of the prescribed region and a size of the prescribed region. FIG. 9A conceptually shows a result in a case that a state of an object moving away from image pick-up portion 4 could appropriately be detected, and FIG. 9B conceptually shows a result in a case that a state that the object moves away from image pick-up portion 4 could not appropriately be detected.

As shown in FIG. 9A, when the object moves away from image pick-up portion 4, brightness of the prescribed region and a size of the prescribed region both decrease. On the other hand, when the object comes closer to image pick-up portion 4, brightness of the prescribed region and the size of the prescribed region both increase. When some cause for error is present in an infrared image, as shown in FIG. 9B, change different from inherent change is detected.

Whether or not appropriate detection has successively been achieved is preferably determined by making use of such relation between brightness of the prescribed region and the size of the prescribed region.

More specifically, whether or not change over time in brightness of the prescribed region and change over time in size of the prescribed region maintain prescribed relation may be determined, and when the prescribed relation is maintained, a position of an object may be determined. Namely, whether or not a direction of change (increase/decrease) in brightness of the prescribed region and change over time (increase/decrease) in size of the prescribed region match with each other may be determined, and when they match, a position of an object is calculated assuming that proper detection has been achieved. In other words, whether or not appropriate detection has successively been achieved can be determined based on match/unmatch in sign (a direction of change) between change over time in brightness of the prescribed region and change over time in size of the prescribed region.

Alternatively, whether or not magnitude in change over time in luminance of the prescribed region and magnitude in change over time in size of the prescribed region maintain prescribed relation may be determined, and when the prescribed relation is maintained, a position of an object may be determined Namely, whether or not a ratio between an amount of change per unit time (increment/decrement) in brightness of the prescribed region and an amount of change per unit time (increment/decrement) in size of the prescribed region is within a prescribed range is determined, and when the ratio is within the prescribed range, a position of an object is calculated assuming that appropriate detection has been achieved. Namely, whether or not appropriate detection has successively been achieved can be determined based on a state of deviation in value between the amount of change per unit time in brightness of the prescribed region and the amount of change per unit time in size of the prescribed region.

(2) Size of the Prescribed Region Satisfying a Prescribed Condition

Instead of/in addition to the method paying attention to relative relation between brightness of the prescribed region and the size of the prescribed region as described above, whether or not a size itself of the prescribed region satisfies a prescribed condition may be determined, and when the prescribed condition is satisfied, a position of a subject may be determined based on brightness of the prescribed region.

More specifically, whether or not appropriate detection has successively been achieved can be determined by determining whether a detected size of the prescribed region is excessively larger or smaller than the size of the prescribed region obtained in calibration (a reference value). Namely, whether or not a ratio or a difference of the detected size of the prescribed region to or from the size of the prescribed region obtained in calibration (a reference value) is within a prescribed range is determined, and only when the ratio or the difference is within the prescribed range, a position of the object may be calculated assuming that appropriate detection has been achieved.

(e4: Calculation of Distance and Position on Plane (Step S22))

Brightness of the prescribed region is in inverse proportion to a square of a distance from image pick-up portion 4 to an object. Therefore, when brightness of the prescribed region is calculated as B at some time point, a distance L between image pick-up portion 4 and the object at that time can be expressed as below.

$$L = L0 \times \sqrt{(B0/B)}$$

L0 represents a distance between image pick-up portion 4 and the object obtained in calibration and B0 represents brightness of the prescribed region obtained in calibration.

With a condition of L0=1 being set, a relative distance between image pick-up portion 4 and the object can be calculated by using brightness B0 of the prescribed region obtained in calibration. This relative distance represents a depth position in a direction of image pick-up by image pick-up portion 4 (a camera direction: a z direction). A position within an infrared image where the prescribed region is present represents a position (an x coordinate and a y coordinate) on a plane orthogonal to the direction of image pick-up by image pick-up portion 4. Thus, in the present embodiment, a depth position of the object in the direction of image pick-up by image pick-up portion 4 which obtains an infrared image is determined based on brightness and a size of the prescribed region. Namely, a depth position is determined and a position on the plane orthogonal to the direction of image pick-up of the object is determined based on a position of the prescribed region within the infrared image.

Finally, an x coordinate, a y coordinate, and a z coordinate of the object defined in a coordinate system with a point of view of image pick-up portion 4 being defined as the reference are output every operation cycle.

(e5: Successive Output (Step S24))

As described above, information processing apparatus 1 calculates a three-dimensional coordinate of an object every operation cycle and obtains a temporal behavior of the object from these chronologically output three-dimensional coordinates. Namely, information processing apparatus 1 outputs change over time in position of the object. With such change over time in position, a gesture made by a user can be determined or various types of game processing can progress.

<F. Calibration>

Calibration should be carried out with the object (subject) being set to the reference state. The reference state may be any state, however, when the object is too close to or far from image pick-up portion 4, accuracy in position determination lowers. Therefore, calibration is preferably carried out at an intermediate point in a range where the object can move. Therefore, a user interface as supporting such calibration may be provided.

One example of a user interface for calibration provided by information processing apparatus 1 in the present embodiment will be described with reference to FIG. 10. Referring to FIG. 10, a guide 70 for positioning a subject to the reference state is displayed on display 2 of information processing apparatus 1 and the user adjusts positional relation between the user himself/herself and/or his/her hand and image pick-up portion 4 such that a hand of which image is picked up is accommodated in guide 70. When the user's hand is accommodated in guide 70, the user operates an OK button 72 displayed on display 2 with the other hand so that an infrared image for calibration is obtained and calibration is performed.

By displaying such a guide, calibration can more appropriately and simply be carried out.

<G. Processing For Calculating Absolute Position>

A processing example in which a relative position of an object is successively determined with a position in the reference state being defined as the reference has been described above. If an absolute position (an absolute distance) in the reference state could be obtained, not a relative position but a pseudo absolute position can be calculated.

A method of using image pick-up portion 4 of information processing apparatus 1 to obtain in advance relation between a size and an absolute position of an object region which appears in an infrared image and using this relation is available as one technique for obtaining an absolute position (an absolute distance) in the reference state. Specifically, relation between a size of the object region and an absolute distance from image pick-up portion 4 can be defined based on an infrared image obtained by using image pick-up portion 4 to pick up images of a sample having an already-known size in advance arranged at a plurality of positions. An absolute distance at the time of image pick-up can be determined by picking up an image of a sample (for example, a stylus attached to information processing apparatus 1) of which size has already been known in calibration and evaluating a size within the infrared image of the sample of which image has been picked up.

When a user's hand is adopted as the object, an average size is known in advance. Therefore, a pseudo absolute distance at the time of calibration may be determined based on the average value.

Figure 11:
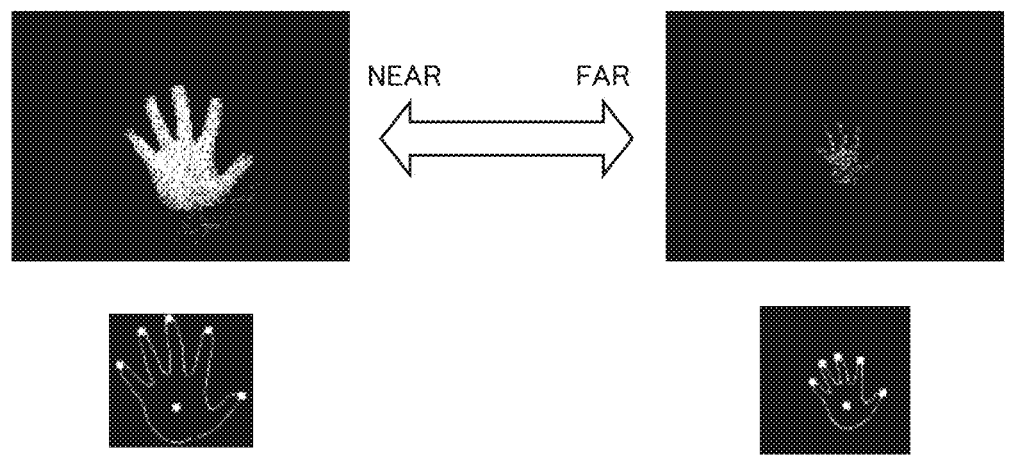
FIG. 11 shows an exemplary illustrative non-limiting drawing illustrating one example of processing for calculating an absolute position in the present embodiment.

One example of processing for calculating an absolute position in the present embodiment will be described with reference to FIG. 11. Relation between a size and an absolute position of the object region which appears in an infrared image which has been obtained in advance may be referred to by specifying a contour of the hand from a feature value within the infrared image and calculating a size of the hand, and then a position (a depth position) where the hand is present may be calculated.

<H. Correction Of Infrared Image>

In the processing for determining a position of an object described above, an object region within an infrared image is specified and a prescribed region is set (steps S4, S6, S14, and S16 in FIG. 5). In such processing, an infrared image including only the object is preferably obtained. When a substance which emits infrared rays is present in the background of the object at the time of image pick-up of the object, however, the infrared rays from such a substance are introduced as noise in the infrared image. In such a case, preferably, the infrared image is subjected to some correction (pre-processing) and then the object region is specified.

Processing in a case that a non-infrared image is used will be described below as processing for correcting such an infrared image. Namely, information processing apparatus 1 in the present embodiment has an image obtaining function to obtain an infrared image mainly including information of infrared rays from an object (subject) and a non-infrared image mainly including information of light different in wavelength from the infrared rays from the object (subject) and a correction function to correct the infrared image based on a feature value of the non-infrared image.

One example of the processing for correcting the infrared image in the present embodiment will be described with reference to FIG. 12. When an infrared image 60 is obtained through image pick-up of an object, an RGB image 50 representing one example of a non-infrared image is obtained. As will be described later, such processing as superimposition of images of RGB image 50 and infrared image 60 is required. Therefore, these two images are preferably obtained by using image pick-up elements in Bayer arrangement including an IR filter as shown in FIG. 6A described above. Though a dual-eye configuration as shown in FIG. 6B may be adopted, in this case, correction in accordance with a parallax present between optical systems is required.

The non-infrared image is not limited to the RGB image, and an ultraviolet image may be employed or a gray image (a monochromatic image) with attention being paid only to any color of R, G, and B may be employed.

Figure 12:
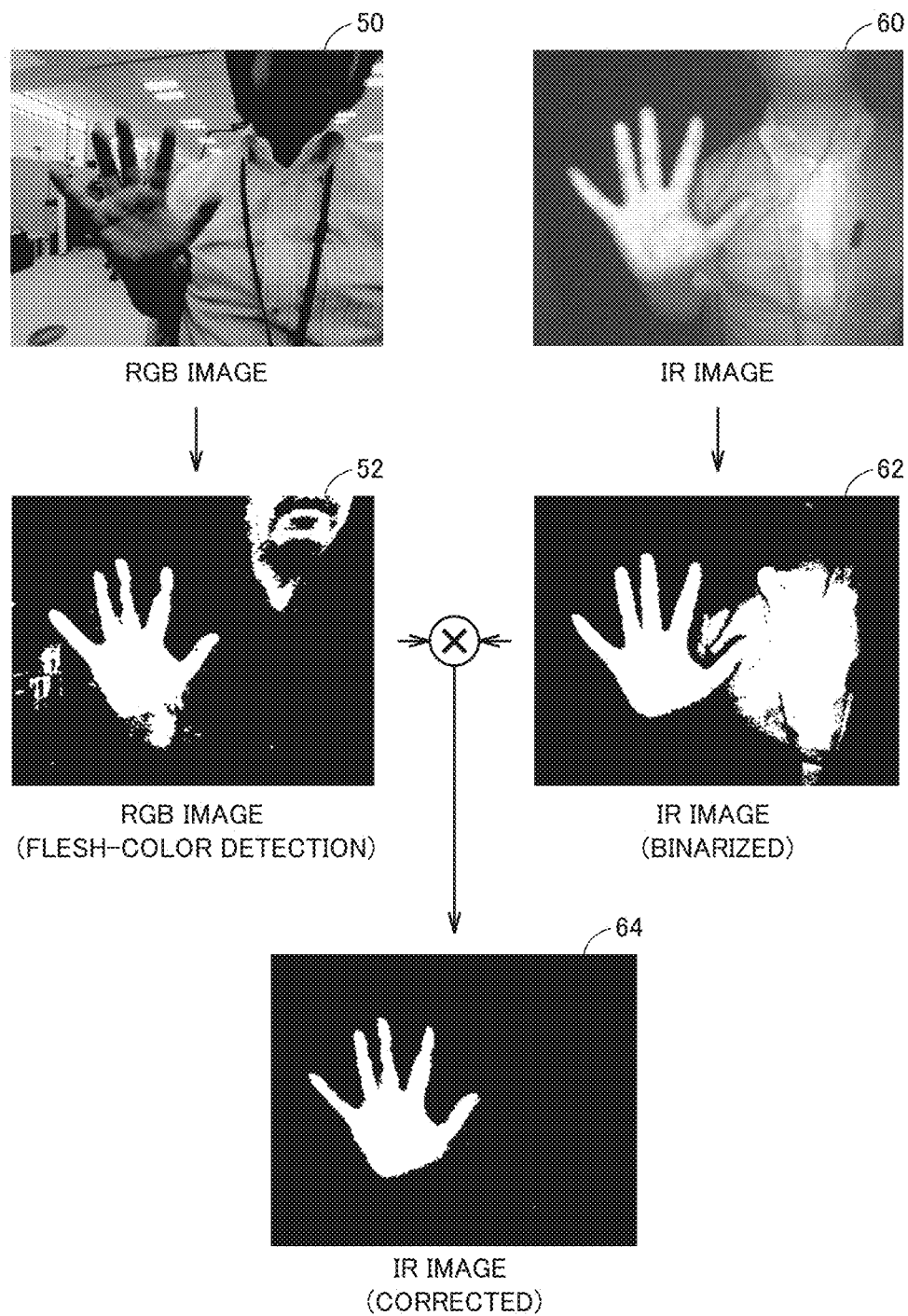
FIG. 12 shows an exemplary illustrative non-limiting drawing illustrating one example of processing for correcting an infrared image in the present embodiment.

As shown in RGB image 50 and infrared image 60 in FIG. 12, luminance information of an object which can be obtained is different depending on a difference in detected wavelength. With the use of such difference in obtained luminance information, correction as allowing extraction only of information on the object is made.

Initially, a feature value reflecting the object is calculated from the non-infrared image. When RGB image 50 is defined as the non-infrared image and the user's hand is defined as the object, for example, flesh-color detection processing can be employed. Namely, a flesh-color region included in RGB image 50 is specified. A result image 52 shows a result after RGB image 50 has been subjected to flesh-color detection. Result image 52 results from conversion of a pixel determined to be in flesh color into "1" (white) and converting pixels other than that into "0" (black). Namely, in the processing for correcting the infrared image, a feature value is obtained by binarizing the non-infrared image.

Figure 13A:
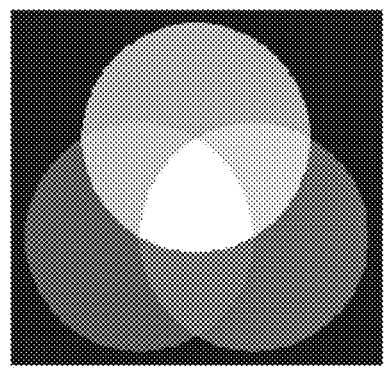
FIGS. 13A and 13B each show an exemplary illustrative non-limiting drawing illustrating one example of processing for specifying a flesh-color region.
Figure 13B:
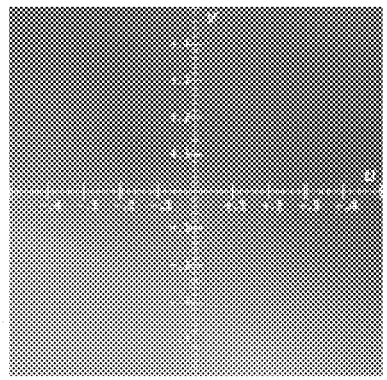

One example of processing for specifying a flesh-color region will be described with reference to FIG. 13. In order to specify a flesh-color region, a color coordinate system of the RGB image is converted from the RGB coordinate system (FIG. 13A) to a YUV coordinate system (FIG. 13B). Then, an image present in a domain (a space) on the color coordinate system which can be regarded as having a "flesh color" defined in advance is extracted from a YUV image converted to the YUV coordinate system. Use of the YUV coordinate system allows more accurate determination of the "flesh color".

Thus, the correction processing in information processing apparatus 1 includes processing for specifying a flesh-color region of the object (subject) from the RGB image and correcting infrared image 60 based on the flesh-color region.

Referring again to FIG. 12, infrared image 60 is also subjected to binarization processing by using prescribed brightness as a threshold value, to thereby generate a binarized infrared image 62. Finally, a corrected infrared image 64 is generated by calculating a product of result image 52 and binarized infrared image 62 for each corresponding pixel. Namely, in the correction processing, processing for multiplying each pixel value of the infrared image by each pixel value of the binarized non-infrared image (result image 52) is performed. This processing means output as an effective pixel, of only such a pixel of which corresponding pixel within result image 52 has been converted into "1" (flesh-color region), among pixels constituting binarized infrared image 62.

Infrared image 60 does not necessarily have to be binarized, and infrared image 60 can be corrected by using result image 52 as one type of mask image and multiplying each pixel value of infrared image 60 by the result image.

As described above, information processing apparatus 1 corrects infrared image 60 based on a feature value (a flesh-color region in the example shown in FIG. 12) of a non-infrared image (RGB image 50). The feature value of the non-infrared image is basically a feature value which cannot be obtained from the infrared image.

Processing for correcting infrared image 60 includes processing for ignoring a region other than the region of infrared image 60 where the object (subject) is present. In other words, means for correcting infrared image 60 includes processing for extracting only a region of infrared image 60 where the object (subject) is present. A series of correction processes means that a region in an image where an object is present is specified from a non-infrared image (RGB image 50) and effective information representing the object (subject) included in infrared image 60 is selectively used in accordance with the specified region. Thus, by selectively using effective information representing the object (subject) included in infrared image 60, an object region within the infrared image can more accurately be specified.

Processing for specifying an object region may further be performed by searching for a specific shape of the object by using RGB image 50 and/or result image 52 shown in FIG. 12. Namely, a position of a contour (or a geometry) of a hand or a finger may be specified from a feature value within the image as described above. By further performing shape specifying processing for specifying a shape of an object (subject) included in such a non-infrared image (RGB image 50 and/or result image 52), a component introduced in the non-infrared image (light from lighting in the background in RGB image 50 in FIG. 12), which can be noise, can be removed.

By further adding such shape specifying processing, effective information representing the object (subject) included in infrared image 60 can more accurately be selected and the object region within the infrared image can more accurately be specified. Namely, the correction processing of information processing apparatus 1 includes the shape specifying processing for specifying a shape of the subject included in the non-infrared image (RGB image 50 and/or result image 52), so that infrared image 60 is corrected based on a feature value in the specified shape.

Various types of processing may be performed by using corrected infrared image 64 and subjecting yet-to-be-corrected infrared image 60 and/or RGB image 50 to different correction. For example, an object region may be specified from corrected infrared image 64, and only information on the object may be extracted by using an image (information) of the region within infrared image 60 or RGB image 50 corresponding to the specified object region. Thus, such a function as reflecting information on the infrared image corrected in the correction processing on a yet-to-be-corrected infrared image or non-infrared image may also be incorporated in information processing apparatus 1.

Figure 14:
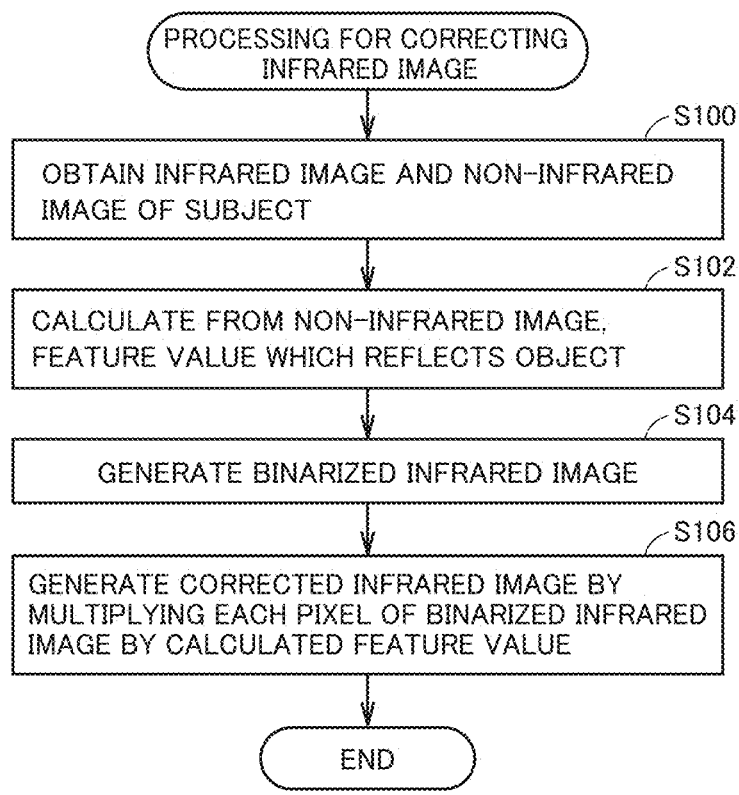
FIG. 14 shows an exemplary illustrative non-limiting flowchart illustrating a processing procedure in processing for correcting an infrared image provided by the image processing program in the present embodiment.

A processing procedure in the processing for correcting an infrared image provided by the image processing program in the present embodiment will be described with reference to FIG. 14. Each step shown in FIG. 14 is implemented typically as CPU 10 executes image processing program 16 (FIG. 2).

Initially, CPU 10 obtains an infrared image and a non-infrared image of a subject (step S100). Here, when image pick-up portion 4 including image pick-up elements in Bayer arrangement as shown in FIG. 6A is employed, an infrared image and a non-infrared image can simultaneously be obtained by providing an image pick-up command to image pick-up portion 4. In contrast, when image pick-up portion 4 in which image pick-up elements are individually provided as shown in FIG. 6B is employed, an infrared image and a non-infrared image are obtained by providing an image pick-up command to each image pick-up element.

In succession, CPU 10 calculates a feature value reflecting an object from the non-infrared image (step S102). Typically, CPU 10 specifies a flesh-color region by subjecting RGB image 50 representing one example of the non-infrared image to flesh-color detection processing. CPU 10 generates binarized infrared image 62 by subjecting infrared image 60 to binarization processing in parallel to the processing in step S102 (step S104).

Then, CPU 102 generates corrected infrared image 64 by multiplying each pixel of binarized infrared image 62 by the feature value calculated in step S102 (step S106). The position determination processing shown in FIG. 5 may be performed by using corrected infrared image 64 generated in step S106.

<I. Advantages>

In the present embodiment, an object region expressing an object within an infrared image is specified and a prescribed region is set in accordance with the object region. Since a position of the object included in the infrared image is determined based on brightness and a size of this set prescribed region, one image pick-up portion will suffice, which allows reduction in cost for mount. In addition, since brightness and the size of the prescribed region within the infrared image obtained for each frame is made use of, an amount of operation required for calculating a distance can be reduced and faster processing can be realized.

In the present embodiment, a position or movement of an object is detected by using a non-infrared image to remove/reduce information on a substance other than the object from the infrared image. Thus, erroneous determination of a position of the object Due to Information on the Substance Other than the Object can be Suppressed.

<J. OTHER EMBODIMENTS>

The present specification includes an embodiment as below.

An exemplary embodiment provides a non-transitory storage medium encoded with a computer readable image processing program executed by a computer. The image processing program causes the computer to perform functionally including obtaining an infrared image mainly including information of infrared rays from a subject and a non-infrared image mainly including information of light different in wavelength from the infrared rays from the subject and correcting the infrared image based on a feature value of the non-infrared image.

In the exemplary embodiment, the feature value of the non-infrared image may be a feature value which cannot be obtained from the infrared image.

In the exemplary embodiment, the non-infrared image may include an RGB image.

In the exemplary embodiment, the correcting step may include specifying a flesh-color region of the subject from the RGB image and correcting the infrared image based on the flesh-color region.

In the exemplary embodiment, the step of obtaining an image may include obtaining the infrared image and the non-infrared image from image pick-up elements in Bayer arrangement including an IR filter.

In the exemplary embodiment, the correcting step may include selectively using effective information representing the subject included in the infrared image.

In the exemplary embodiment, the correcting step may include ignoring a region of the infrared image other than the region where the subject is present.

In the exemplary embodiment, the correcting step may extract only the region of the infrared image where the subject is present.

In the exemplary embodiment, the correcting step may include specifying a shape of the subject included in the non-infrared image and the infrared image may be corrected based on a feature value in the specified shape.

In the exemplary embodiment, the correcting step may include obtaining a feature value by binarizing the non-infrared image.

In the exemplary embodiment, the correcting step may include multiplying each pixel value of the infrared image by each pixel value of the binarized non-infrared image.

In the exemplary embodiment, the functionality may further include reflecting the information on the infrared image corrected in the correcting step on a yet-to-be-corrected infrared image or the non-infrared image.

An exemplary embodiment provides an information processing system. The information processing system includes an image pick-up portion for picking up an image of infrared light from a subject and light different in wavelength from infrared rays from the subject and a processing portion for correcting an infrared image obtained through image pick-up by the image pick-up portion based on a feature value of a non-infrared image obtained through image pick-up by the image pick-up portion.

An exemplary embodiment provides an information processing system. The information processing system includes an image obtaining module that obtains an infrared image mainly including information of infrared rays from a subject and a non-infrared image mainly including information of light different in wavelength from the infrared rays from the subject and a correction module that corrects the infrared image based on a feature value of the non-infrared image.

An exemplary embodiment provides an image processing method. The image processing method includes obtaining an infrared image mainly including information of infrared rays from a subject and a non-infrared image mainly including information of light different in wavelength from the infrared rays from the subject and correcting the infrared image based on a feature value of the non-infrared image.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable image processing program executable by a computer processor coupled with an image pick-up device having an infrared (IR) sensor, the image processing program causing the computer processor to perform functionality comprising:
    obtaining an infrared image including a subject using the IR sensor of the image pick-up device;
    detecting, in response to the image pick-up device, whether a direction of change of brightness of a prescribed region of the subject within the obtained infrared image over time is inverse to a direction of change of size of the prescribed region of the subject within the obtained infrared image over time;
    determining, in response to the detecting, a position of the subject within the infrared image by analyzing a brightness and a size of a prescribed region of the subject within the obtained infrared image when the brightness of the prescribed region and the size of the prescribed region satisfy a prescribed relation, wherein the prescribed relation is used to generate a signal indicating when a change in the brightness is an invalid basis for determining a changed position; and
    using the determined position as user input to control an application.

2. The non-transitory storage medium according to claim 1, wherein determining the position includes determining a relative position of the subject with a reference position.

3. The non-transitory storage medium according to claim 2, wherein determining the position includes determining the reference position based on an infrared image corresponding to the subject positioned in a reference state.

4. The non-transitory storage medium according to claim 1, wherein determining a position of the subject is based on the brightness of the prescribed region when the size of the prescribed region satisfies a prescribed condition.

5. The non-transitory storage medium according to claim 1, wherein determining the position of the subject includes determining a depth position of the subject in a direction of image pick-up by the IR sensor which obtains the infrared image, based on the brightness and the size of the prescribed region.

6. The non-transitory storage medium according to claim 5, wherein determining the position includes determining the depth position and determining a position on a surface orthogonal to the direction of image pick-up of the subject based on a position of the prescribed region within the infrared image.

7. The non-transitory storage medium according to claim 1, wherein determining the position includes specifying a region of the subject in the obtained infrared image and specifying the prescribed region in accordance with the specified region of the subject.

8. The non-transitory storage medium according to claim 7, wherein specifying the prescribed region of the subject is based on at least a part of a shape which the subject intrinsically has.

9. The non-transitory storage medium according to claim 1, wherein determining the position includes determining the position of the subject when change over time in brightness of the prescribed region and change over time in size of the prescribed region maintain the prescribed relation.

10. The non-transitory storage medium according to claim 1, wherein determining the position includes determining the position of the subject when magnitude of change over time in brightness of the prescribed region and magnitude of change over time in size of the prescribed region maintain the prescribed relation.

11. The non-transitory storage medium according to claim 1, wherein determining the position includes outputting change over time in position of the subject.

12. The non-transitory storage medium according to claim 1, wherein an obtained infrared image includes infrared rays emitted by the subject.

13. An information processing system capable of analyzing aspects of an image, comprising:
   an image pick-up device including one or more infrared light sensors configured to obtain an infrared light image including a subject; and
   a computer processor and memory containing instructions for causing the processor to perform operations to detect whether a direction of change of brightness of a prescribed region of the subject within the obtained infrared image over time is inverse to a direction of change of size of the prescribed region of the subject within the obtained infrared image over time, and determine, in response to the detecting, a position of the subject within the obtained infrared light image based on brightness and a size of a prescribed region of the subject within the obtained infrared light image when the brightness of the prescribed region and the size of the prescribed region satisfy a prescribed relation, wherein the prescribed relation is used to generate a signal indicating when a change in the brightness is an invalid basis for determining a changed position;
   the processor being configured to use the determined position as user input to control an application.

14. An information processing apparatus capable of analyzing aspects of an image, comprising:
   an image sensor arrangement having one or more infrared light sensors configured to obtain an infrared image including a subject; and
   a computer processor operatively coupled to the image sensor arrangement and to a memory, the memory containing instructions for causing the processor to perform operations to detect whether a direction of change of brightness of a prescribed region of the subject within the obtained infrared image over time is inverse to a direction of change of size of the prescribed region of the subject within the obtained infrared image over time, and to determine, in response to the detecting, a position of the subject within the obtained infrared image by analyzing brightness and size of a prescribed region of the subject within the obtained infrared image when the brightness of the prescribed region and the size of the prescribed region satisfy a prescribed relation, wherein the prescribed relation is used to generate a signal indicating when a change in the brightness is an invalid basis for determining a changed position;
   the processor using the determined position as user input to control an application.

15. An information processing method for analyzing aspects of an acquired image, comprising:
   using an image pick-up device having one or more infrared light sensors to obtain an infrared image including a subject;
   using a computer processor with memory containing instructions for causing the processor to perform operations to detect whether a direction of change of brightness of a prescribed region of the subject within the obtained infrared image over time is inverse to a direction of change of size of the prescribed region of the subject within the obtained infrared image over time, and to determine, in response to the detecting, a position of the subject within the obtained infrared image by analyzing brightness and a size of a prescribed region of the subject within the infrared image when the brightness of the prescribed region and the size of the prescribed region satisfy a prescribed relation, wherein the prescribed relation is used to generate a signal indicating when a change in the brightness is an invalid basis for determining a changed position; and
   using the determined position as user input to control an application.

16. The non-transitory storage medium according to claim 1, wherein determining comprises determining relative distance based on brightness only.

17. The non-transitory storage medium according to claim 1, wherein the prescribed relation is further used to check whether the change in the brightness is a valid basis for determining a changed position.

18. The non-transitory storage medium according to claim 1, wherein the prescribed relationship is used to infer whether the change in the brightness is caused by the illuminated object moving towards and away from the infrared sensor at an oblique angle.

19. The non-transitory storage medium according to claim 1, wherein the prescribed region is set for each of plural successive control cycles.

20. The non-transitory storage medium according to claim 1, wherein the processor continually captures new images of the object and updates the prescribed region of the object in response to the newly captured images.

21. The non-transitory storage medium according to claim 1, wherein the processor determines the absolute distance of the object.

* * * * *